United States Patent
Lee et al.

(10) Patent No.: US 11,496,462 B2
(45) Date of Patent: Nov. 8, 2022

(54) SECURE MULTIFACTOR AUTHENTICATION WITH PUSH AUTHENTICATION

(71) Applicant: JPMorgan Chase Bank, N.A., New York, NY (US)

(72) Inventors: Felix C. P. Lee, Hong Kong (HK); Jason Severn, Hong Kong (HK); Boris T. H. So, Hong Kong (HK); Jason Chun Kit Wan, Hong Kong (HK); Kevin Chi Chung Wong, Hong Kong (HK)

(73) Assignee: JPMORGAN CHASE BANK, N.A., New York, NY (US)

( * ) Notice: Subject to any disclaimer, the term of this patent is extended or adjusted under 35 U.S.C. 154(b) by 490 days.

(21) Appl. No.: 16/204,350

(22) Filed: Nov. 29, 2018

(65) Prior Publication Data
US 2019/0166118 A1    May 30, 2019

Related U.S. Application Data

(60) Provisional application No. 62/592,012, filed on Nov. 29, 2017.

(51) Int. Cl.
*H04L 29/06* (2006.01)
*H04L 9/40* (2022.01)
(Continued)

(52) U.S. Cl.
CPC ........ *H04L 63/0853* (2013.01); *H04L 9/3213* (2013.01); *H04L 9/3226* (2013.01);
(Continued)

(58) Field of Classification Search
CPC ............... H04L 63/0853; H04L 63/102; H04L 63/0861; H04L 63/101; H04L 63/18;
(Continued)

(56) References Cited

U.S. PATENT DOCUMENTS 5,845,069 A * 12/1998 Tanaka ................. G06Q 20/206
726/20
6,012,143 A * 1/2000 Tanaka ................. G06Q 20/206
705/18
(Continued)

FOREIGN PATENT DOCUMENTS

CN    1340764 A * 3/2002
JP    4095680 B2 * 6/2008 ........... G06Q 20/341
(Continued)

OTHER PUBLICATIONS

Aboudagga. "Authentication protocols for ad hoc networks: taxonomy and research issues." In Proceedings of the 1st ACM international workshop on Quality of service & security in wireless and mobile networks, pp. 96-104. 2005. (Year: 2005).*
(Continued)

*Primary Examiner* — Luu T Pham
*Assistant Examiner* — Walter J Malinowski
(74) *Attorney, Agent, or Firm* — Greenblum & Bernstein, P.L.C.

(57) ABSTRACT

Improved systems and methods of authenticating a user using a mobile device to access a secure electronic portal are provided. A user may be enabled to quickly and securely log onto a website or other electronic portal using a handheld electronic device. In certain embodiments, multifactor authentication is utilized to improve the security of the authentication process.

19 Claims, 6 Drawing Sheets

(51) Int. Cl.
*H04L 9/32* (2006.01)
*H04W 12/06* (2021.01)
*H04W 12/77* (2021.01)
*H04W 4/12* (2009.01)
*H04L 67/55* (2022.01)

(52) U.S. Cl.
CPC .......... *H04L 9/3228* (2013.01); *H04L 9/3231* (2013.01); *H04L 9/3236* (2013.01); *H04L 63/102* (2013.01); *H04W 12/06* (2013.01); *H04W 12/77* (2021.01); *H04L 63/0428* (2013.01); *H04L 63/083* (2013.01); *H04L 63/0861* (2013.01); *H04L 63/101* (2013.01); *H04L 63/18* (2013.01); *H04L 67/55* (2022.05); *H04L 2209/80* (2013.01); *H04L 2463/082* (2013.01); *H04W 4/12* (2013.01)

(58) Field of Classification Search
CPC . H04L 63/0428; H04L 63/083; H04L 9/3213; H04L 9/3226; H04L 9/3228; H04L 9/3231; H04L 9/3236; H04L 67/26; H04L 2209/80; H04L 2463/082; H04W 12/06; H04W 12/77; H04W 12/12
USPC .......................................................... 726/7
See application file for complete search history.

(56) References Cited

U.S. PATENT DOCUMENTS

| | | | | |
|---|---|---|---|---|
| 6,339,788 B1* | 1/2002 | Geyer | H04L 12/433 | 709/220 |
| 6,370,380 B1* | 4/2002 | Norefors | H04W 12/10 | 455/436 |
| 8,200,775 B2* | 6/2012 | Moore | H04L 63/20 | 709/217 |
| 8,625,796 B1* | 1/2014 | Ben Ayed | H04W 12/64 | 380/258 |
| 8,739,260 B1* | 5/2014 | Damm-Goossens | H04W 12/065 | 726/7 |
| 8,875,255 B1* | 10/2014 | Dotan | G06F 21/31 | 726/5 |
| 8,955,076 B1* | 2/2015 | Faibish | H04L 63/108 | 726/7 |
| 9,137,228 B1* | 9/2015 | Newstadt | H04L 63/08 | |
| 10,104,077 B1* | 10/2018 | Irwan | H04L 63/0442 | |
| 11,157,943 B2* | 10/2021 | Basu | G06Q 20/387 | |
| 2002/0065774 A1* | 5/2002 | Young | G06Q 20/327 | 705/41 |
| 2006/0174104 A1* | 8/2006 | Crichton | H04L 63/08 | 713/155 |
| 2010/0106568 A1* | 4/2010 | Grimes | G06Q 30/0254 | 705/14.1 |
| 2011/0004753 A1* | 1/2011 | Gomi | H04L 9/3213 | 713/156 |
| 2011/0131108 A1* | 6/2011 | Doxey | G06Q 30/0601 | 705/26.1 |
| 2011/0251892 A1* | 10/2011 | Laracey | G06Q 20/20 | 705/16 |
| 2012/0330769 A1* | 12/2012 | Arceo | G06Q 20/4014 | 705/21 |
| 2013/0055362 A1* | 2/2013 | Rathbun | H04L 63/0853 | 726/5 |
| 2013/0080351 A1* | 3/2013 | Schneider | G06Q 40/04 | 705/36 R |
| 2013/0091543 A1* | 4/2013 | Wade | H04W 12/086 | 726/1 |
| 2013/0267204 A1* | 10/2013 | Schultz | H04W 12/06 | 455/411 |
| 2013/0297513 A1* | 11/2013 | Kirillin | G06Q 20/4014 | 705/67 |
| 2013/0346302 A1* | 12/2013 | Purves | G06Q 20/108 | 705/40 |
| 2014/0025467 A1* | 1/2014 | Nagarajan | G06Q 30/02 | 705/14.26 |
| 2014/0040993 A1* | 2/2014 | Lorenzo | G06F 21/45 | 726/4 |
| 2014/0180959 A1* | 6/2014 | Gillen | G06Q 10/0833 | 705/341 |
| 2014/0245396 A1* | 8/2014 | Oberheide | G06F 21/40 | 726/4 |
| 2014/0250518 A1* | 9/2014 | Schneider | G06F 21/34 | 726/9 |
| 2014/0281562 A1* | 9/2014 | Kespohl | G06F 21/77 | 713/184 |
| 2014/0282961 A1* | 9/2014 | Dorfman | H04L 63/0861 | 726/7 |
| 2014/0304059 A1* | 10/2014 | Wang | G06Q 30/0234 | 705/14.34 |
| 2015/0095219 A1* | 4/2015 | Hurley | G06Q 20/3823 | 705/39 |
| 2015/0117373 A1* | 4/2015 | Thies | H04L 51/14 | 370/329 |
| 2015/0220917 A1* | 8/2015 | Aabye | G06Q 20/3278 | 705/64 |
| 2015/0295915 A1* | 10/2015 | Xiu | G06F 21/313 | 726/7 |
| 2015/0378581 A1* | 12/2015 | Dietz | G06F 3/0488 | 715/769 |
| 2016/0006718 A1* | 1/2016 | Huxham | H04L 63/0281 | 726/6 |
| 2016/0019547 A1* | 1/2016 | Gurnani | G06Q 20/40145 | 705/44 |
| 2016/0112464 A1* | 4/2016 | Nyshadham | H04L 65/1069 | 709/227 |
| 2016/0188436 A1* | 6/2016 | Wong | G06Q 30/018 | 717/126 |
| 2016/0215036 A1* | 7/2016 | Verdine | C07K 14/62 | |
| 2016/0248742 A1* | 8/2016 | Baghdasaryan | H04L 63/0815 | |
| 2017/0083914 A1* | 3/2017 | Baker | G06Q 20/12 | |
| 2017/0118025 A1* | 4/2017 | Shastri | H04L 9/3234 | |
| 2017/0195879 A1* | 7/2017 | Jones-McFadden | G06Q 20/425 | |
| 2017/0262845 A1* | 9/2017 | Eisen | G06Q 20/3274 | |
| 2017/0289120 A1* | 10/2017 | Kohli | H04L 63/08 | |
| 2017/0331824 A1* | 11/2017 | Pender | H04L 63/0892 | |
| 2017/0364713 A1* | 12/2017 | Speak | G06F 21/70 | |
| 2018/0062863 A1* | 3/2018 | Baskaran | H04L 63/067 | |
| 2018/0097787 A1* | 4/2018 | Murthy | H04L 63/0236 | |
| 2018/0137382 A1* | 5/2018 | Nowak | G06F 16/90335 | |
| 2018/0203652 A1* | 7/2018 | Narita | G06F 3/1236 | |
| 2018/0262503 A1* | 9/2018 | Dawson | G06F 21/46 | |
| 2019/0364426 A1* | 11/2019 | Muthukrishnan | G06Q 20/4016 | |
| 2019/0386984 A1* | 12/2019 | Thakkar | H04L 63/18 | |
| 2020/0005300 A1* | 1/2020 | Oberheide | G06Q 20/40145 | |
| 2021/0099540 A1* | 4/2021 | Howard | H04L 67/306 | |

FOREIGN PATENT DOCUMENTS

KR 102154384 B1 * 9/2020
WO WO-2010083243 A2 * 7/2010 ......... G06Q 20/3825

OTHER PUBLICATIONS

Bassu, Devasis, Munir Cochinwala, and Ashish Jain. "A new mobile biometric based upon usage context." In 2013 IEEE International Conference on Technologies for Homeland Security (HST), pp. 441-446. IEEE, 2013. (Year: 2013).*

Hazra, Tushar K. "Building enterprise portals: principles to practice." In Proceedings of the 24th International Conference on Software Engineering, pp. 623-633. 2002. (Year: 2002).*

Kansakar, Prasanna, and Arslan Munir. "A two-tiered heterogeneous and reconfigurable application processor for future internet of things." In 2018 IEEE Computer Society Annual Symposium on VLSI (ISVLSI), pp. 690-696. IEEE, 2018. (Year: 2018).*

Bhargav-Spantzel, Abhilasha, Jungha Woo, and Elisa Bertino. "Receipt management-transaction history based trust establishment." In Pro- (56) References Cited

OTHER PUBLICATIONS ceedings of the 2007 ACM workshop on Digital identity management, pp. 82-91. 2007. (Year: 2007).*

Yang, Kan, Xiaohua Jia, and Kui Ren. "Secure and verifiable policy update outsourcing for big data access control in the cloud." IEEE Transactions on Parallel and Distributed Systems 26, No. 12 (2014): 3461-3470. (Year: 2014).*

Panduranga, Sathya Narayana. "Simplifying mobile commerce through a trusted transaction broker." In 2005 IEEE International Conference on Personal Wireless Communications, 2005. ICPWC 2005., pp. 267-271. IEEE, 2005. (Year: 2005).*

\* cited by examiner

SECURE MULTIFACTOR AUTHENTICATION WITH PUSH AUTHENTICATION

TECHNICAL FIELD

The present disclosure generally relates to improved systems and methods for enabling a user to quickly and securely log onto a website or other electronic portal using a handheld electronic device.

BACKGROUND

Using secured websites and other electronic portals is becoming commonplace. Usernames and passwords consisting of combinations of text characters have traditionally been used as user credentials needed to access these portals. In response to growing security concerns, organizations have relied upon increasingly complex login requirements in order to enhance security of their websites and online portals. Example requirements may include longer and more complex passwords and/or multifactor/multistep authentication. However, with increasing levels of complexity comes increasing levels of input difficulty and user frustration. As a result, a user may find alternative sources for the information, goods, or services that they are attempting to access or the user may select easy to remember, but likely less secure login credentials. Multifactor authentication, which is a method of authenticating a user by requiring two or more separate forms or methods of identification, is one way that an organization may attempt to increase security. However, this method still requires that a user have a username and password to initiate the login process.

Therefore a need exists for systems and methods for securely logging on to a website or other electronic portal that combines enhanced security with easy to remember and input credentials.

SUMMARY

In an exemplary embodiment, a system for facilitating secure access to an electronic portal is provided. The system comprises an authentication portal configured to receive an access request from a user device, generate an authentication request including a transaction ID, and transmit the authentication request to an authentication service. The system further comprises an authentication service configured to receive the authentication request and generate and transmit a notification to an authentication application associated with the user device, wherein the notification is configured to prompt the user device for a simple passcode. The system further comprises an authentication application configured to receive the first notification and accept user input of the simple passcode, and authenticate the user input of the simple passcode and upon successful authentication, grant access to the authentication portal.

In some exemplary embodiments, the portable electronic device may require a second user authenticating input before an authentication code is provided to the secure portal.

In another exemplary embodiment, a secure portal may be opened on a mobile device whereupon a request to an authentication service may be made. The authentication service may then send a command to the mobile device which instructs the mobile application program to receive identifying information from a user of the mobile device. The authentication service may then use the identifying information to validate the user and provide access to the secure portal.

In another exemplary embodiment, a computer implemented method for facilitating secure access to an electronic portal is provided. The method comprises the steps of, at an authentication portal: receiving an access request from a user device; generating an authentication request including a transaction ID; transmitting the authentication request to an authentication service. The method further comprises the steps of, at the authentication service: receiving the authentication request from the authentication portal; generating a first notification configured to prompt the user device for input of a simple passcode; transmitting the first notification to an authentication application. The method further comprises the steps of, at the authentication application: receiving the first notification and accepting user input of the simple passcode; authenticating the user input of the simple passcode and upon successful authentication, granting access to the authentication portal.

In another exemplary embodiment, a portal may prompt a user with an offer or other promotion and then configure a mobile device to authenticate a user wishing to take advantage of the offer.

The above and other aspects, features, and advantages of the disclosure will become more readily apparent from the following description and figures, illustrating by way of example the principles of the disclosure.

BRIEF DESCRIPTION OF THE DRAWINGS

These and other features of the present disclosure will become better understood with regard to the following description and accompanying drawings in which.

DETAILED DESCRIPTION

Electronic portals such as those accessible by web pages may typically be secured with text-based usernames and passwords consisting of combinations of alphanumeric and special characters. However, with the increasing number of fraudulent transactions, system breaches, and instances of data theft experienced by organizations, traditional username and password combinations are becoming less secure. Multifactor authentication provides one way of increasing the security of electronic portals by authenticating a user with multiple credentials. However, multifactor authentication often places additional burdens on a user, for example, by requiring additional actions or inputs by the user. For instance, a user may be required to carry a separate electronic device, additional to an access device, that generates a unique code according to an algorithm that is extremely difficult for an unauthorized party to determine. The user must then enter the code manually on the access device. While secure, these methods are inconvenient for the user in that physical possession of multiple devices and manual entry of the code are required. These additional methods of authentication are often further limited to text-based inputs, which may be difficult to remember or burdensome to manually input. The aforementioned technical problems are solved by the technical solutions of the present disclosure. For instance, exemplary embodiments of the present disclosure may improve on authentication at an electronic portal by permitting a user to log on to the portal using a secure application that accepts a simple passcode in order to provide authorization for the user to access the electronic portal. Further embodiments allow for multifactor authentication using a mobile device to authenticate access to an electronic portal at a separate device. Reducing the complexity of the required user input while maintaining or improving security on or at an online portal may further improve the computer systems which maintain the electronic portal. These and other advantages of the present disclosure will be further explained below.

Figure 1:
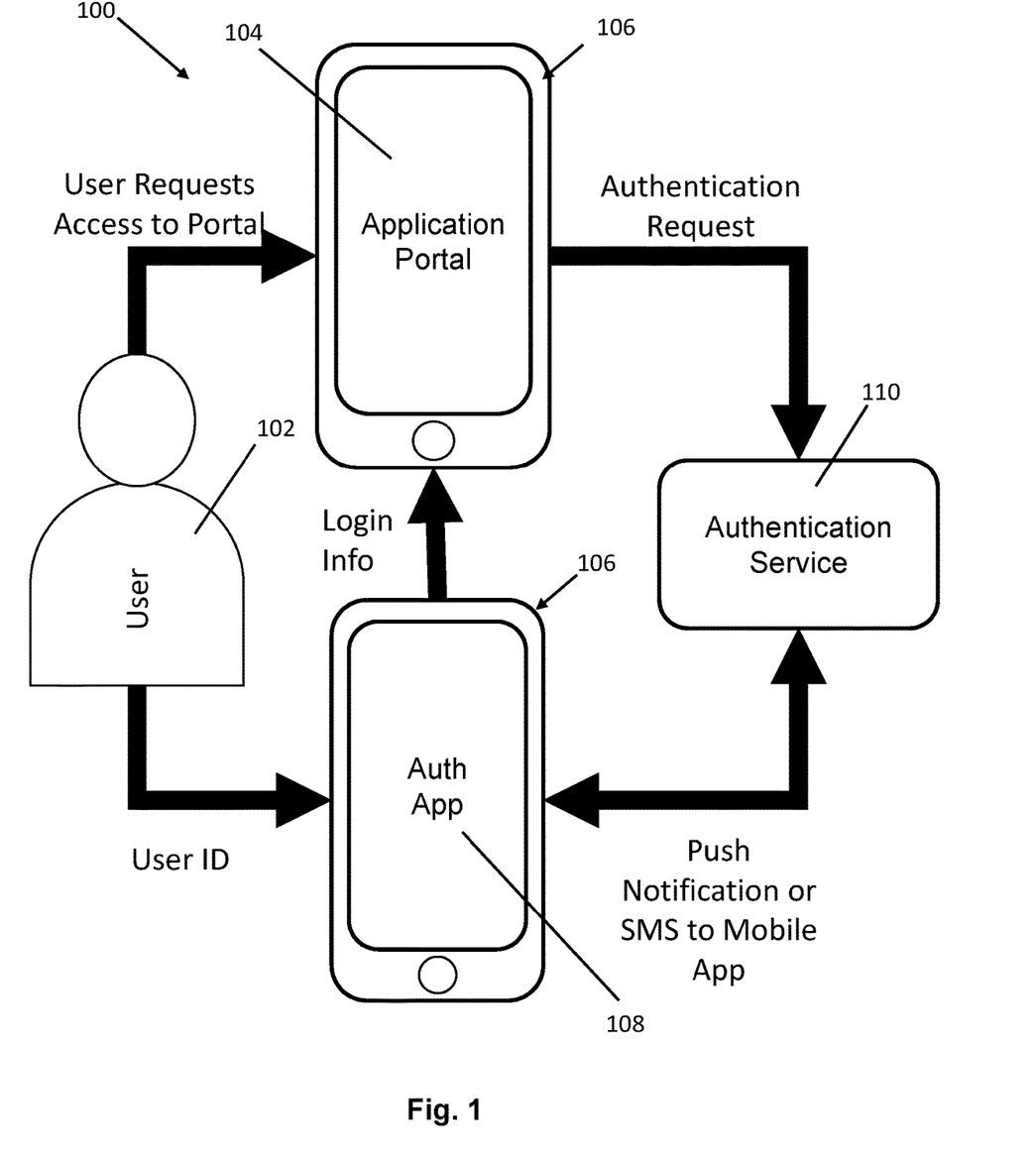
FIG. 1 is a diagram of a system illustrating a mobile device logging onto a secure portal.

As shown in the exemplary embodiment of FIG. 1, a system 100 for facilitating secure access to an electronic portal controls access to an application portal 104. Application portal 104 may be various websites or portals accessible over a network, for example, Internet network connection. In some embodiments, application portal 104 is an intranet portal accessible to a limited number of users, for example, users connected to a company wi-fi access point. In some embodiments, Application portal 104 may be accessible by a user 102 via a browser of mobile device 106. Mobile device 106 may be an Internet connected smart phone, tablet computer, laptop computer or the like, comprising at least an input device and a display. In some embodiments mobile device 106 has at least one camera capable of taking pictures or recognizing images. It will be further appreciated that various configurations of computer hardware and software may be implemented with mobile device 106, such that a processor is configured to communicate with a memory and operable to execute instructions stored in the memory. In some embodiments, the input device and display may be combined in a single device, such as a touch screen. Mobile device 106 may be configured to accept user input via a physical or virtual keyboard, a touch screen, a stylus, digital pen, etc. In some embodiments, mobile device 106 may be configured to accept user input in the form of biometric information such as a fingerprint, thumbprint, facial identification, voice identification, retinal scan, or the like.

In the system 100, a user 102 may request access to the application portal 104 via an authentication application 108. In some embodiments, authentication application 108 is an application downloaded or executed locally on mobile device 106. Once a portal access request has been received, the application portal 104 may create or generate a unique transaction ID based on information relating to the user 102 and/or the application portal 104. In some embodiments, the transaction ID comprises a hash token, such as a large number generated by an encryption algorithm. The transaction ID may contain further information describing the transaction, such as, for example, the access time, access location, user ID, device ID, etc. The application portal 104 may generate an authentication request comprising, including, or otherwise associated with the transaction ID. The application portal 104 can then transmit the authentication request to authentication service 110. Upon receipt of the authentication request, the authentication service 110 may be configured to send a first notification to the authentication application 108 for display on mobile device 106. As used herein, a notification may include, but is not limited to, an electronic message such as a push notification or SMS text message. Other forms of electronic notifications will be apparent to those of skill in the art.

In certain embodiments, in response to the notification, the user 102 may be prompted to enter login information in the form of a simple passcode. A simple passcode may be a personal identification number (PIN), biometric identifier, personal identification pattern (PIP), or similar non-text based passcode. In certain embodiments, the simple passcode may be comprised of multiple user inputs, for example, multiple biometric inputs. It will be appreciated that various combinations of the aforementioned categories of simple passcodes may be combined into a single simple passcode. For example, a user may be required to input a fingerprint biometric identifier in addition to a personal identification pattern.

The simple passcode, as described herein, eliminates the requirement that a user memorize lengthy and complex combinations of text and instead rely on an easy to remember combination or pattern input. In some embodiments, a pattern input may comprise a tracing a series of connections between dots on a grid. In some embodiments, the pattern input grid comprises 9 input areas corresponding to the 1-9 digits of a standard touchtone telephone. It will be appreciated that the number of input areas may vary, wherein for every added input area, the complexity of the passcode increases. For instance, the number of possible pattern passcode combinations in a pattern grid can be expressed as $X^n$, where X is the number of input areas and n is the length of the passcode e.g. the number of connections between the input areas. In the case of biometric data, the user experience is further improved as the user is not required to remember any credentials. Login information may combine a simple passcode with additional required information specific to the user such as a username or user ID. User login information may be predefined during a user registration process separate from the portal access attempt, for example, when the authentication application 108 is first installed on mobile device 106. In some embodiments, the user 102 must first accept a notification, which may include information or terms related to access of the portal, before entering any login information. Upon accepting of the notification and terms, the user 102 may then enter any required login information.

The authentication application 108 is configured to authenticate the user input and in response to a positive authentication, may communicate with the authentication portal 104 to indicate that a user is authorized to access the portal. The authentication application 108 may perform authentication of the user input by determining a match between a locally stored simple passcode and the input simple passcode. In other embodiments, authentication application 108 is configured to communicate with a user information database that is configured to store user passcodes to retrieve a user passcode in order to determine if the input passcode is a match. During registration of a user's simple passcode, the passcode may be encrypted by a hash key generated from a hardware security module (HSM) and stored in a database. A match is performed by comparing a given input simple passcode, which is encrypted using the same hash key from the HSM, with the original encrypted passcode stored in the database. In some embodiments, the authentication application 108 may call an application program interface (API) associated with the application portal 104 with a notification that the user 102 is authorized to access the application portal. In some embodiments, after or in conjunction with the communication between the authentication application 108 and the application portal 104 indicating a positive authentication, the authentication service 110 may generate an authorized user token and transmit the token to the authentication application 108, which then may provide the authorized user token to the application portal 104. The authorized user token can be used to approve user access between servers, for example, between an authentication server and application portal. In some embodiments, the functions of the authentication service 110 may be combined such that the user 102 and application portal 104 each communicate with the authentication service directly. In other exemplary embodiments, the authentication service 110 may be distributed such that the user 102 and application portal 104 may communicate with different portions of the service located on different servers, or embodied as different services of a collection of services.

Figure 2:
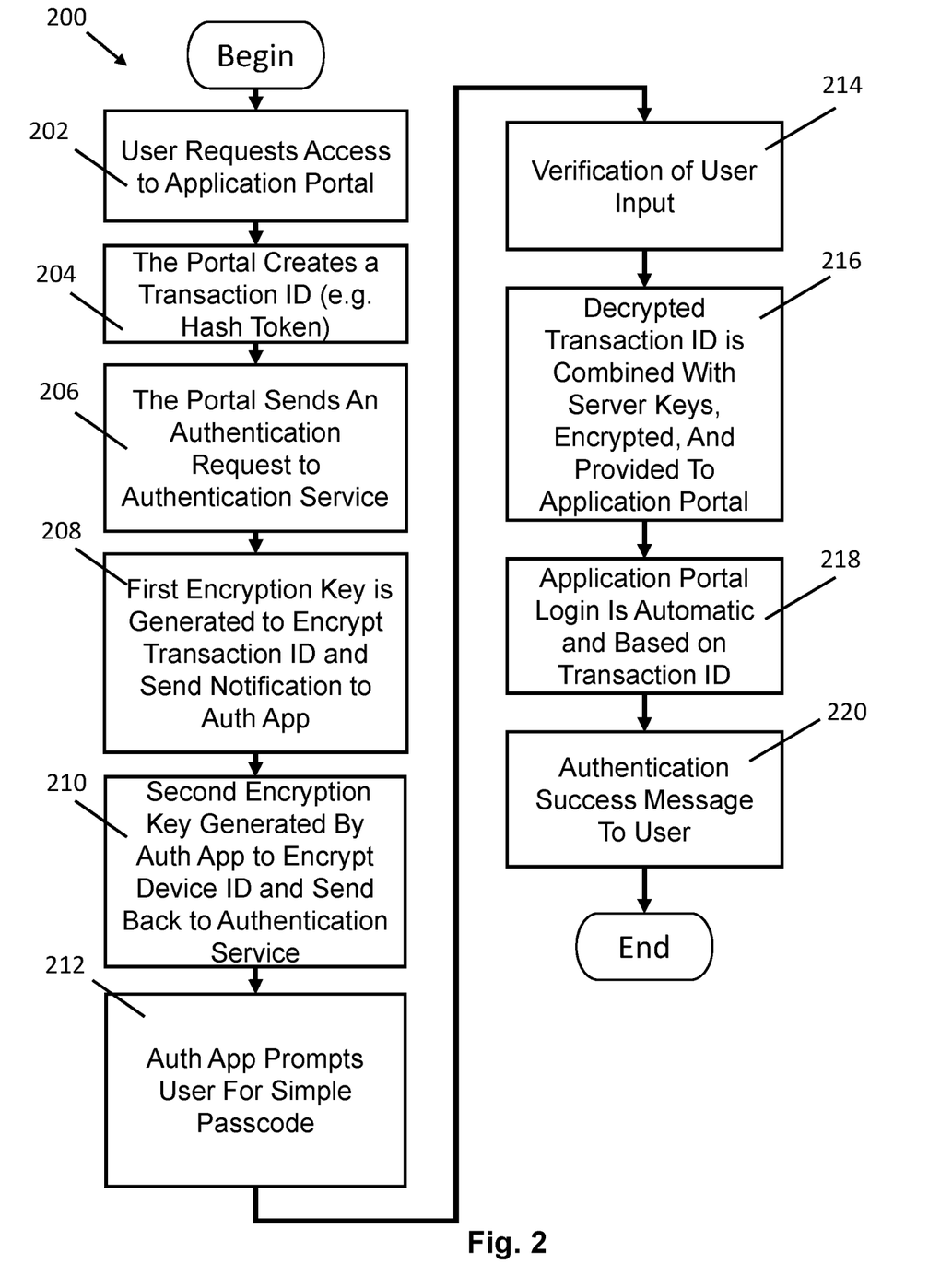
FIG. 2 is a flow chart of a process of an exemplary implementation of the system of FIG. 1.

In FIG. 2, an exemplary process 200 for facilitating secure access to an electronic portal is provided. It will be appreciated that the user 102, application portal 104, mobile device 106, authentication application 108, and the authentication service 110 described with respect to process 200 can exhibit the same or similar functions and features as their counterparts in system 100. In step 202, a user 102 may request access to an application portal 104. In step 204, application portal 104 may generate an authentication request and an associated transaction ID. In some embodiments, the transaction ID may comprise a hash token, such as a large number generated by an encryption algorithm. In step 206, authentication portal 104 may generate and send the authentication request and associated transaction ID to the authentication service 110. In step 208, the authentication service 110 is configured to generate a first encryption key, for example a Key A, which may be used to encrypt the transaction ID. Also in step 208, authentication service 110 is configured to transmit a notification to authentication application 108. In some embodiments, the notification includes the encrypted transaction ID. The encrypted transaction ID may be transmitted to the authentication application 108 in association with the notification or may be transmitted separately.

In step 210, authentication application 108 may generate a second encryption key, for example Key B, which may be used to encrypt a device ID. A device ID may comprise identifying information associated with authentication application 108 or mobile device 106, such as the make and model information of the device. In some embodiments, the device ID is pre-registered during an onboarding process, such as when a user signs up and sets a passcode. Once encrypted, the device ID may be transmitted by the authentication application 108 to the authentication service 110. In step 212, the encrypted transaction ID is decrypted by authentication application 108. Upon decryption of the transaction ID, the authentication application 108 is configured to prompt for user input of a simple passcode, for example, a personal identification number (PIN), biometric identifier, personal identification pattern (PIP), or the like. In some embodiments, the authentication application 108 is configured to identify a login ID at the application and request user input. The login ID may comprise information related to the log in process, for example, a user ID, application ID, and page ID. In response to this request, the user may input a simple passcode which is verified and authenticated in step 214. In step 216, at the authentication service 110, the transaction ID is decrypted, verified, combined with secure portal keys, re-encrypted, and provided to the application portal 104. In some embodiments, the transaction ID is re-encrypted at the mobile device 106 and transmitted to the authentication service 110.

In step 218, the transaction ID from step 216 may be combined with a pre-generated device key, the verification result of step 214, and the server keys from step 216. In some embodiments, step 218 is performed at the authentication service 110. The device key can be used to generate an authentication code which is provided to the portal in step 218 to electronically "sign" the transaction associated with the authentication request. A dynamic encryption key may be generated and used to encrypt a transaction detail before it is sent to the portal for authorization. A transaction detail may comprise information relating to the transaction. In certain embodiments the transaction detail is a read only message. In other embodiments, the transaction detail is dynamic an may prompt user action or input. Once authorized, at step 220 an authentication success notification or message may be generated and displayed at mobile device 106. In some embodiments, the authentication notification is generated at the application portal 104 and transmitted to authentication application 108 for display on the mobile device 106. In other embodiments, the notification is generated at authentication application 108. Upon receipt of the notification, the user is provided access to application portal 104.

Figure 3:
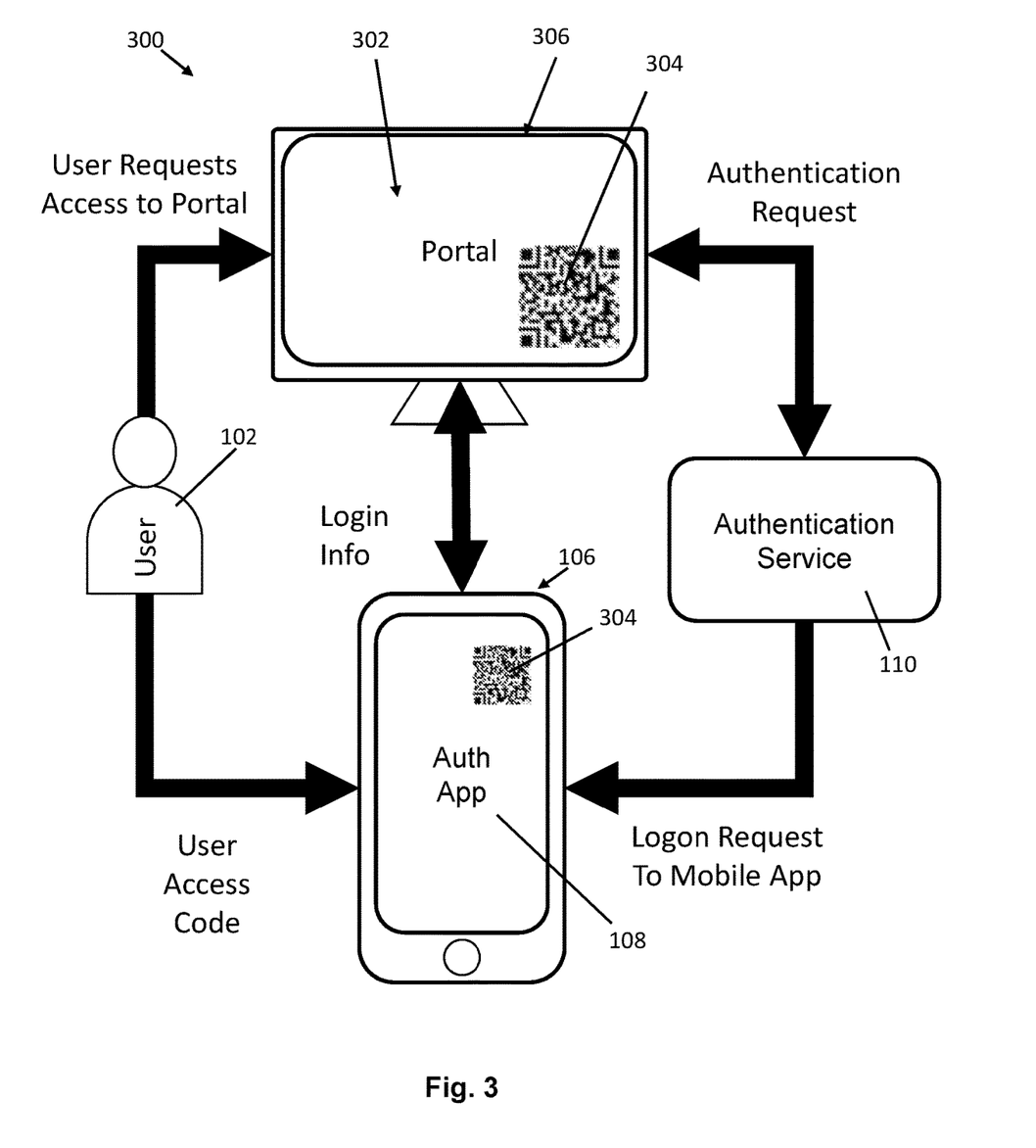
FIG. 3 is a diagram of a system illustrating a mobile device logging onto a secure portal using a personal computer.

While FIG. 1 illustrates a system 100 wherein the portal and application are accessed using a mobile device 106, however, in certain embodiments, it may be desirable to implement multifactor or multistep authentication using a mobile device in conjunction with a secondary device such as a laptop or desktop computer. An example of such a system 300 is illustrated in FIG. 3. It will be appreciated that the components and features as described in system 300 share the same or similar functionality with their counterparts in system 100. Namely, user 102, application portal 104, mobile device 106, authentication application 108, and the authentication service 110 are operable in substantially similar ways as described with regard to system 100.

In system 300, a user 102 requests access to a portal 302 in a web browser at computer 306. An example of this may be a user navigating to a web page and clicking a "log on" button. In response to the access request, portal 302 may be configured to generate an authentication image 304. The authentication image 304 may be a quick response (QR) code, barcode, or the like, which is generated using a code generator at portal 302. In some embodiments, portal 302 may be configured to communicate over a network with a code generation engine which is configured to generate the authentication image and transmit the generated image for display at portal 302. In certain embodiments, the authentication image may be a generated image that may be verified by distinct coloration or other unique features. In other embodiments, the authentication may be a stock photograph. Other variations of authentication images will be appreciated by those of skill in the art.

While the authentication image is displayed at portal 302, a user 102 may be prompted to execute authentication application 108 and scan the authentication image 304 using a camera associated with mobile device 106. Once the authentication image 304 is recognized by authentication application 108, portal 302 is configured to generate a transaction ID. In some embodiments the transaction ID comprises a hash token, such as a large number generated by an encryption algorithm. Portal 302 may then generate an authentication request comprising, including, or otherwise associated with the transaction ID. Portal 302 may further be configured to transmit the authentication request to authentication service 110. Upon receipt of the authentication request, the authentication service 110 may be configured to send a notification (for example, without limitation, a push notification or SMS text message) to the authentication application 108 for display on mobile device 106. In certain embodiments, in response to the notification, the user 102 may be prompted to enter login information in the form of a simple passcode. A simple passcode may be a personal identification number (PIN), biometric identifier, personal identification pattern (PIP), or similar non-text based passcode.

The authentication application 108 is then configured to authenticate the user input and in response to a positive authentication, may communicate with the portal 302 to indicate that a user is authorized to access the portal. In some embodiments, the authentication application 108 may call an application program interface (API) associated with the portal 302 with a notification that the user 102 is authorized to access the application portal. In some embodiments, after or in conjunction with the communication between the authentication application 108 and the portal 302 indicating a positive authentication, the authentication service 110 may generate an authorized user token and transmit the token to the authentication application 108, which then may provide the authorized user token to the portal 302. Upon successful authentication, an authentication success notification or message may be generated and displayed at the portal 302 and/or at mobile device 106. In some embodiments, the authentication notification is generated at the portal 302 and transmitted to authentication application 108 for display on the mobile device 106. In other embodiments, the authentication notification is generated at authentication application 108 and displayed on the mobile device 106. Upon receipt of the authentication notification, the user is provided access to portal 302.

Figure 4:
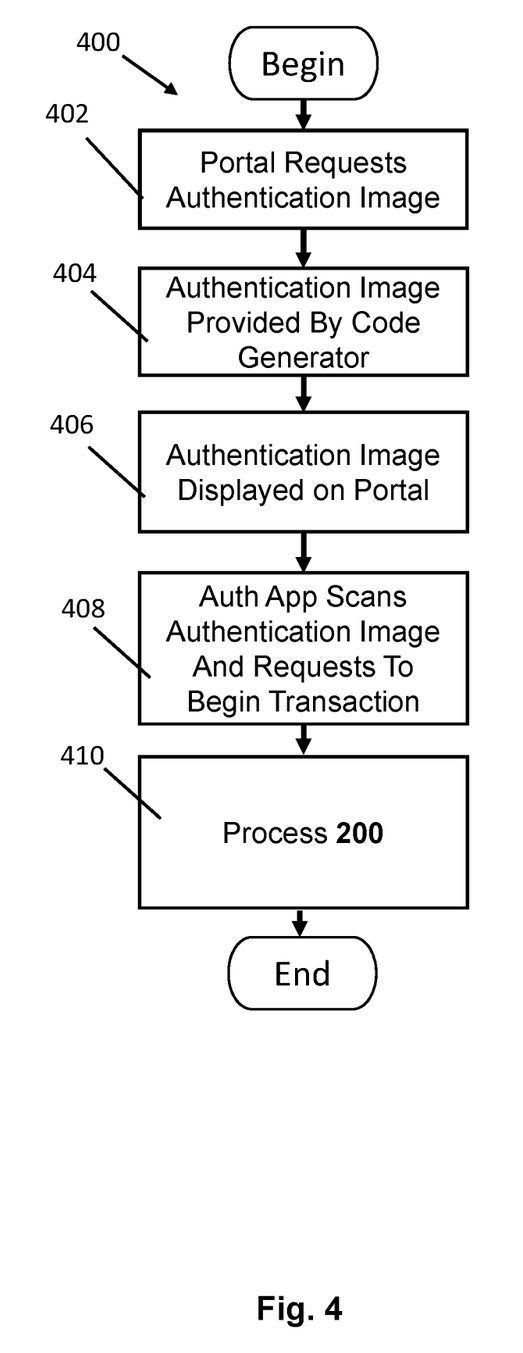
FIG. 4 is a flow chart of a process of an exemplary implementation of the system of FIG. 3.

Referring to FIG. 4, an exemplary process 400 is performed. Process 400 is representative of an exemplary implementation using system 300. In step 402, the portal 302 may request an authentication image, such as a QR code. In step 404, a code generator may generate an authentication image 304 and transmit the image for display at portal 302 at step 406. In some embodiments, portal 302 is configured to generate the authentication image locally. The user 102 may then use a camera associated with mobile device 106 and authentication application 108 to scan the authentication image in step 408. Using the authentication image 304 to identify the portal 302, the authentication application 108 requests a transaction ID which begins an implementation of process 200 at step 410. It will be appreciated that the process 200, as implemented by process 400, functions in a substantially similar way, wherein portal 302 may have the same features and is operable to perform the same or similar functions as application portal 104.

Figure 5:
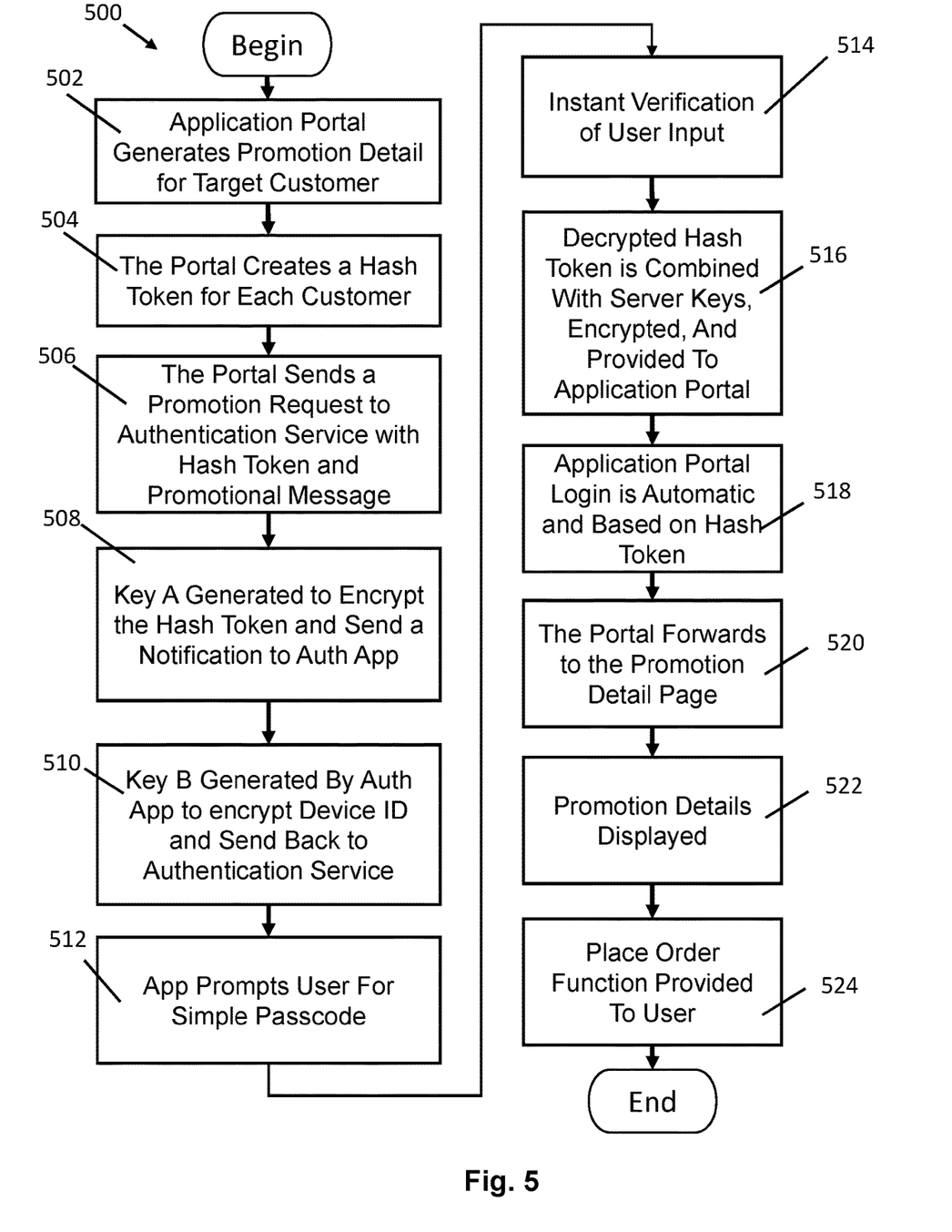
FIG. 5 is a flow chart of a process in which a mobile device is used to log onto a secure portal in response to a promotional offer or other notification.

In addition to situations in which a user 102 actively seeks to log into a secure portal, other embodiments may provide a notification to the user that prompts the user to log into a secure portal. For example, a user may be using a desktop computer to log in to an application portal, and the portal could generate and transmit a notification to the user's mobile device to perform authentication without input of a username and password on the desktop. Such situations may be utilized to offer purchase opportunities to a user 102 or to notify the user that accessing the secure portal is required. As shown in FIG. 5, a process 500 for logging onto a secure portal in response to a promotional offer or other notification is provided. According to the process 500, in step 502, an application portal 104 generates a promotion detail for a target customer or customers. In step 504, the portal creates a hash token which represents a user session identifier. A separate hash token is generated for each user. The application portal 104 may send a promotion request to the authentication service 110 in step 506. The promotion request may include at least one hash token and a promotional message. A promotional message may be a text promotion message, for example, a special request for authorizing a high volume user transaction. In step 508, the authentication service generates a first encryption key, Key A, to encrypt the hash token that is generated by the application portal 104, and then sends a notification to the user 102. The authentication application combines that first encryption key with the device ID, encrypts the resulting value, and sends it back to the authentication service 110 in step 510. In step 512, this encrypted value from the portal is decrypted to identify the login ID at the application and request user input. The user 102 accepts the notification and enters a predefined entry. An example of such an entry is, without limitation, a PIN, a biometric identifier, or PIP. The user input is verified in step 514. In step 516, the hash token is decrypted, verified, combined with secure portal keys, re-encrypted, and provided to the application portal 104.

In step 518, the encrypted code from step 516 is decrypted by the authorization application 108. A device key is generated and combined with the code created in step 514 and the server keys from step 516. This device key is used to produce a one-time password which is provided to the portal in step 518 to electronically "sign" the transaction associated with the authentication request. If the application portal login is successful in step 518, then the application portal will automatically forward to a promotion detail page in step 520. The secure portal 104 may display the promotion or other message to the user 102 in step 522. In the case of a promotion, the user 102 may be presented with the promoted offering and a "place order" function in step 524.

Figure 6:
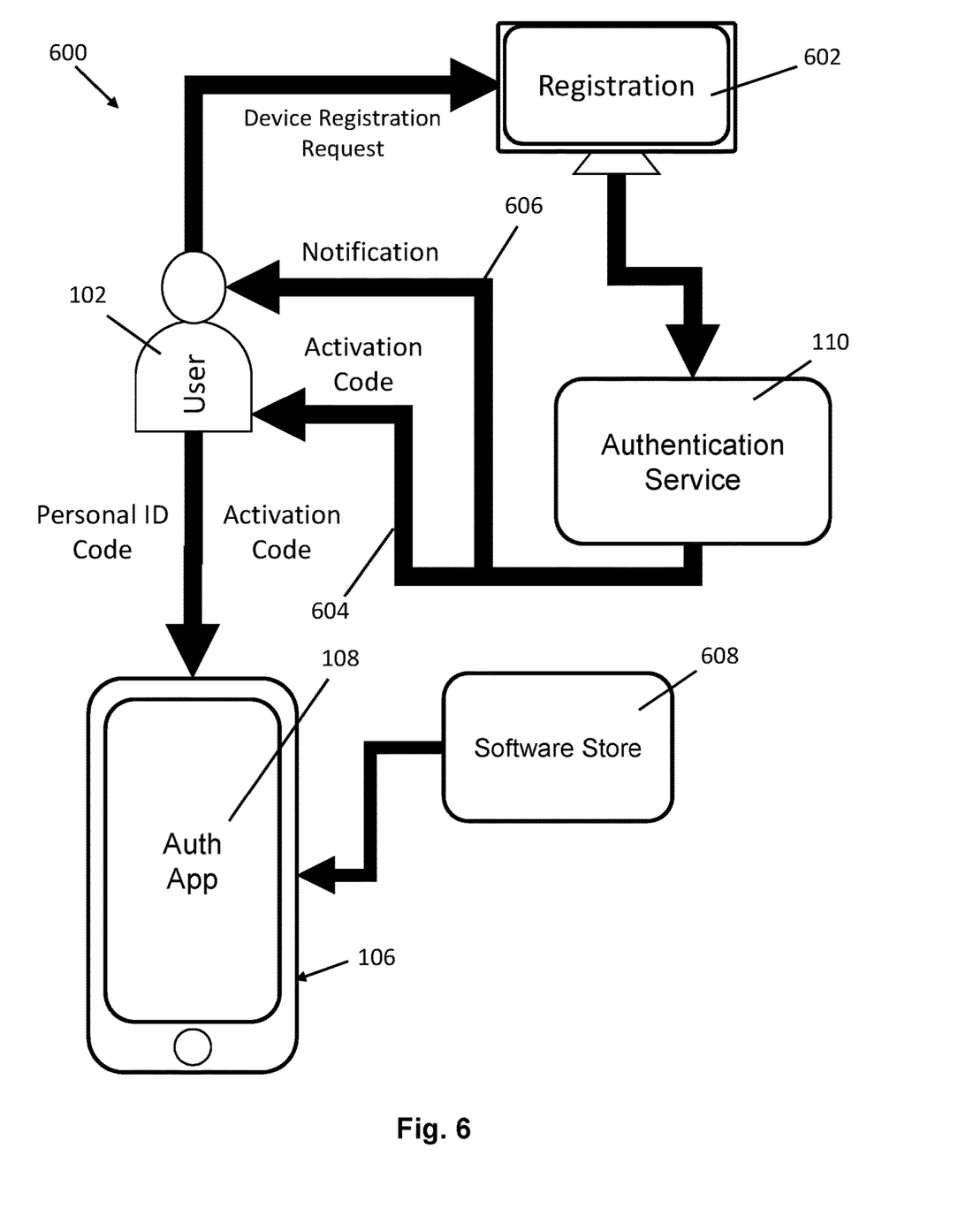
FIG. 6 is diagram of a system illustrating a user registering an authentication application running on their mobile device.

In some embodiments, a user must register their device or account in order to utilizes the secure portal access features as described herein. As shown in FIG. 6, a system 600 for allowing a user 102 to register an authentication application running on their mobile device is provided. In the system 600, a user 102 that wishes to utilize the authentication application 108 requests authentication from a registration server 602. The registration server 602 obtains authentication information from the user 102. When the user 102 has been fully authenticated, the registration server 602 communicates the user information to the authentication service 110 which provides activation code information 604 to the user 102. The authentication server may also provide a second notification 606 to the user 102. The second notification may comprise a completion message detailing the authorized action. The user 102 may enter the activation code into the authentication application 108 downloaded from a software store 608, which the user had previously installed on a mobile device 106. In this manner, the one-time authentication process may be more rigorous than would normally be tolerated by the user 102 for authorization each time the user wished to access a secure portal.

While the present disclosure and associated concepts have been illustrated by the description of various embodiments thereof, and while these embodiments have been described in considerable detail, it is not the intention of the Applicant to restrict or in any way limit the scope of the disclosure to such detail. Additional advantages and modifications will readily appear to those skilled in the art. Moreover, in some instances, elements described with one embodiment may be readily adapted for use with other embodiments. Therefore, the disclosure, in its broader aspects, is not limited to the specific details, the representative apparatus, and illustrative examples shown and described. Accordingly, departures may be made from such details without departing from the spirit or scope of the general concepts described and enabled herein.

What is claimed is:

1. A system for facilitating secure access to an electronic portal comprising:
    a plurality of processors;
    a memory; and
    a communication interface coupled to each of the plurality of processors and the memory,
    wherein an authentication portal processor is configured to:
        receive an access request from a user device in response to a promotional message, the promotional message including a transaction request to authorize a high-volume user transaction;
        request an authentication image from a code generator;
        receive an authentication image;
        display the authentication image at the authentication portal;
        receive an authentication confirmation from an authentication application in response to the authentication application recognizing the authentication image;
        generate an authentication request including a transaction ID that is based on information corresponding to a user, the user device, and the electronic portal, the transaction ID including data that corresponds to an access time, an access location, a user identifier, and a device identifier; and
        transmit the authentication request to an authentication service processor;
    wherein the authentication service processor is configured to:
        receive the authentication request;
        generate an encryption key;
        encrypt the transaction ID in the authentication request by using the encryption key; and
        generate and transmit a notification to an authentication application processor that is associated with the user device, the notification including the encrypted transaction ID and a prompt to the user device for a simple passcode;
    wherein the authentication application processor is configured to:
        receive the notification and decrypt the transaction ID;
        identify a login ID from the decrypted transaction ID;
        accept user input of the simple passcode; and
        authenticate the user input of the simple passcode based on the login ID and upon successful authentication, grant access to an authentication portal by causing the authentication application processor to,
        re-encrypt the decrypted transaction ID;
        transmit the re-encrypted transaction ID to the authentication service processor; and
        call an application programming interface that is associated with the authentication portal processor with a notice that the user is authorized to access the authentication portal.

2. The system of claim 1, wherein the simple passcode comprises at least one of a personal identification number (PIN), biometric identifier, or personal identification pattern.

3. The system of claim 2, wherein the simple passcode comprises a plurality of a personal identification number (PIN), biometric identifier, or personal identification pattern.

4. The system of claim 1, wherein the authentication service processor is further configured to:
    encrypt the transaction ID;
    transmit the encrypted transaction ID to the authentication application processor.

5. The system of claim 4, wherein the encrypted transaction ID is transmitted with the notification.

6. The system of claim 1, wherein the transaction ID comprises a hash token.

7. The system of claim 1, wherein the authentication portal processor is further configured to:
    generate a first authentication image.

8. The system of claim 7, wherein the authentication application processor is further configured to:
    scan and recognize the first authentication image generated by the authentication portal processor.

9. A computer implemented method for facilitating secure access to an electronic portal through multifactor authentication, the method comprising:
    at an authentication portal:
        receiving an access request from a user device in response to a promotional message, the promotional message including a transaction request to authorize a high-volume user transaction;
        requesting an authentication image from a code generator;
        receiving an authentication image;
        displaying the authentication image at the authentication portal;
        receiving an authentication confirmation from an authentication application in response to the authentication application recognizing the authentication image;
        generating an authentication request including a transaction ID that is based on information corresponding to a user, the user device, and the electronic portal, the transaction ID including data that corresponds to an access time, an access location, a user identifier, and a device identifier; and
        transmitting the authentication request to an authentication service;
    at the authentication service:
        receiving the authentication request from the authentication portal;
        generating an encryption key;
        encrypting the transaction ID in the authentication request by using the encryption key;
        generating a notification configured to prompt the user device for input of a simple passcode, the notification including the encrypted transaction ID; and
        transmitting the notification to the authentication application;
    at the authentication application:
        receiving the notification and decrypting the transaction ID;
        identifying a login ID from the decrypted transaction ID;
        accepting user input of the simple passcode;
        authenticating the user input of the simple passcode based on the login ID and upon successful authentication, granting access to the authentication portal by,
            re-encrypting the decrypted transaction ID;

transmitting the re-encrypted transaction ID to the authentication service; and calling an application programming interface that is associated with the authentication portal with a notice that the user is authorized to access the authentication portal.

10. The method of claim 9, wherein the authentication image comprises a quick response (QR) code.

11. The method of claim 10, further comprising:
at the authentication portal:
generating a promotion detail for a target customer;
generating a hash token for the target customer;
transmitting a promotion request to the authentication service.

12. The method of claim 11, wherein the promotion request comprises the hash token and the promotional message.

13. The method of claim 9, wherein the simple passcode comprises at least one of a personal identification number (PIN), biometric identifier, or personal identification pattern.

14. The method of claim 13, wherein the simple passcode comprises a plurality of a personal identification number (PIN), biometric identifier, or personal identification pattern.

15. The method of claim 9, further comprising:
at the authentication service, encrypting the transaction ID and transmitting the encrypted transaction ID to the authentication application.

16. The method of claim 15, further comprising:
transmitting the encrypted transaction ID with the notification.

17. The method of claim 9, wherein the transaction ID comprises a hash token.

18. The method of claim 9, further comprising:
at the authentication portal, generating a first authentication image.

19. The method of claim 18, further comprising:
at the authentication application, scanning and recognizing the first authentication image generated by the authentication portal.

* * * * *